United States Patent
Bonas et al.

(10) Patent No.: US 9,459,975 B2
(45) Date of Patent: Oct. 4, 2016

(54) MANAGING STORAGE CONNECTIONS (71) Applicant: Red Hat Israel, Ltd., Raanana (IL)

(72) Inventors: Alissa Bonas, Kiryat Bialik (IL); Daniel Erez, Tel-Aviv (IL); Allon Mureinik, Tel-Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 91 days.

(21) Appl. No.: 14/311,067

(22) Filed: Jun. 20, 2014

(65) Prior Publication Data
US 2015/0370667 A1 Dec. 24, 2015

(51) Int. Cl.
*G06F 11/20* (2006.01)
*G06F 11/14* (2006.01)

(52) U.S. Cl.
CPC ........ *G06F 11/2094* (2013.01); *G06F 11/1479* (2013.01); *G06F 2201/815* (2013.01)

(58) Field of Classification Search
CPC ........... G06F 11/1458; G06F 11/1456; G06F 11/20; G06F 11/1448; G06F 11/2089; G06F 11/2094; G06F 11/2069; G06F 3/067; G06F 3/0607; G06F 3/0635; G06F 3/0665
See application file for complete search history.

(56) References Cited

U.S. PATENT DOCUMENTS

| | | | |
|---|---|---|---|
| 7,487,308 B1 * | 2/2009 | Dalal | G06F 3/0607 711/100 |
| 7,565,567 B2 * | 7/2009 | Ross | G06F 11/0712 714/2 |
| 8,589,550 B1 | 11/2013 | Failbish et al. | |
| 2009/0187645 A1 * | 7/2009 | Hayden | H04L 69/14 709/220 |
| 2011/0252273 A1 * | 10/2011 | Callaway | G06F 11/1641 714/4.11 |
| 2013/0013655 A1 * | 1/2013 | Lacapra | G06F 17/30206 707/827 |
| 2014/0059392 A1 * | 2/2014 | Ren | G06F 11/301 714/47.1 |
| 2014/0173330 A1 * | 6/2014 | Samanta | G06F 11/20 714/4.11 |

* cited by examiner

*Primary Examiner* — Nadeem Iqbal
(74) *Attorney, Agent, or Firm* — Lowenstein Sandler LLP (57) ABSTRACT

A processing device identifies a failure with at least one physical storage device of a first set of physical storage devices accessible to a virtualized environment via a logical storage domain. The logical storage domain has an assigned address. The processing device identifies a backup of the first set of physical storage devices. The backup includes a second set of physical storage devices. The processing device also prevents the virtualized environment from accessing the first set of physical storage devices. The processing device associates the second set of physical storage devices with the logical storage domain to cause storage access of the virtualized environment to be redirected to the second set of physical storage devices via the logical storage domain.

20 Claims, 4 Drawing Sheets

MANAGING STORAGE CONNECTIONS

TECHNICAL FIELD

Embodiments of the present disclosure relate to data storage, and more specifically to managing storage connections.

BACKGROUND

A virtualization platform generally includes multiple hosts and at least one storage manager. Each host can include at least one virtual machine (VM). A VM is a software implementation of a computing device that may perform the same functions as physical machines. The storage manager can coordinate storage resources for the VM.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein are techniques for managing storage connections for a storage domain. Under conventional systems, when instantiating a virtual machine (VM) on a host, a storage manager may define a storage domain that provides the host with access to a set of physical storage resources (e.g., a set of primary storage resources). The host may be connected to the set of physical storage resources via the storage domain. One or more virtual disks for the VM may be defined within the storage domain. For example, when instantiating a VM, a system administrator can indicate that the VM is to have 25 GB of storage. The storage manager can allocate 25 GB from the storage domain as a logical storage entity (e.g., a virtual disk). The VM can be instantiated on a host and the logical storage entity may be associated with the VM, where the logical storage entity is backed by the set of physical storage resources.

In some instances, the set of storage devices may no longer be accessible to the host, which may render the logical storage entity inoperable. For example, a component associated with the set of primary storage devices (e.g., a hardware disk) may have failed, the host may no longer have access (e.g., access has been removed or blocked by a system administrator, a firewall, etc.) to the set of primary storage devices, and the like. When the set of storage devices is no longer accessible to the host, conventional storage domains and/or logical entities typically may not be modified or edited to point or connect to a different set of storage devices. Instead, under conventional systems, a new storage domain may be created with a new name and path to point to the different set of storage devices (e.g., a backup set of storage devices). Moreover, under conventional systems, a change in the underlying physical storage for a storage domain would entail updating various configuration details for each VM that is associated with the storage domain, which can impose a significant burden on a system administrator who would manually update the configuration for each VM.

Implementations of the present disclosure address these and other shortcomings by providing mechanisms to manage storage connections for a storage domain. For example, using the techniques described herein, a connection to a set of storage devices for a storage domain may be modified to point or connect to a different set of storage devices without otherwise modifying the storage domain. Any hosts that are connected to the storage domain may remain connected to the storage domain; even though the underlying set of storage devices may change.

In one embodiment, a storage manager identifies a failure with at least one physical storage device of a first set of physical storage devices accessible to a host via a storage domain. The storage manager identifies a second set of physical storage devices (e.g., a backup of the first set of physical storage devices). The backup includes a second set of physical storage devices that are not accessible to the host. The storage manager prevents access of the host to the first set of physical storage devices, and associates the second set of physical storage devices with the storage domain to cause storage access of the host to be redirected to the second set of physical storage devices via the storage domain.

Accordingly, a storage domain of embodiments of the present disclosure represents a logical entity that serves as an interface between the host (and/or virtual machines) and/or physical storage devices. With such a storage domain, the host and/or the virtual machines no longer need to know of or be reconfigured for a different set of physical storage devices, thereby significantly simplifying the task of a system administrator and eliminating a possibility of human errors due to manual reconfiguration.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
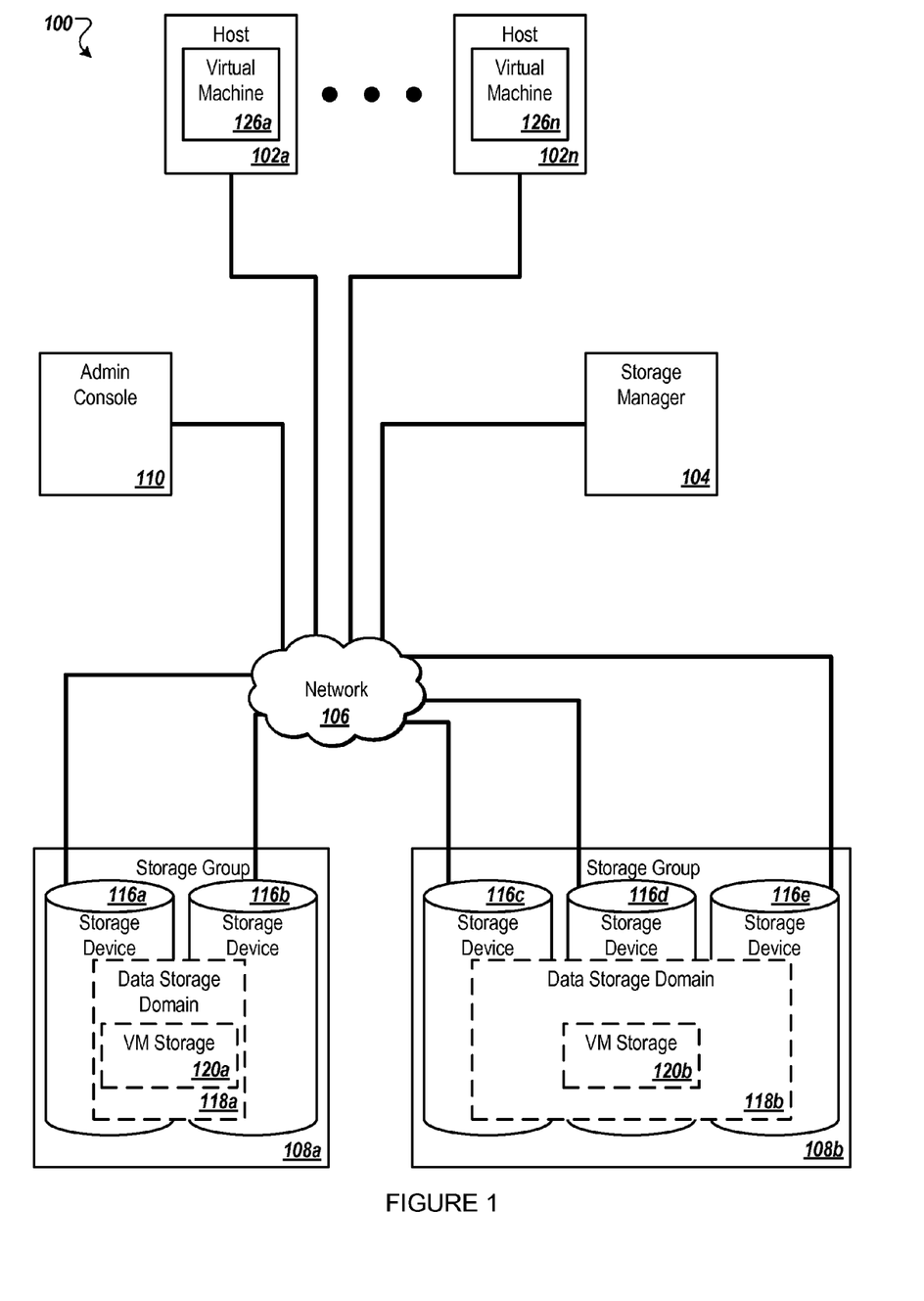
FIG. 1 is a block diagram that illustrates an embodiment of an example system for managing storage connections for a host, in accordance with embodiments.

FIG. 1 is a block diagram that illustrates an example system architecture 100 for managing storage connections for a storage domain in which aspects of the present disclosure can be implemented. The system architecture 100 may include one or more hosts 102a-n, a storage manager 104, a network 106, one or more storage groups 108a-n and an admin console 110.

The host machine (host) 102 may be a rackmount server, a workstation, a desktop computer, a notebook computer, a tablet computer, a mobile phone, a palm-sized computing device, a personal digital assistant (PDA), etc. The host 102 may provide a virtualized environment (e.g., a VM) that can access a set of storage resources via a storage domain. A virtual machine (VM) 126 is a virtual desktop or virtual server containing an operating system and a set of applications. Additionally, the host 102 may include a database and/or database management system (DBMS), a hypervisor and/or virtual machines 126a-n, or other functionality.

Each of the storage devices 116a-e is a physical storage device. A group of the storage devices 116a-b forms a first storage group 108a and another group of the storage devices 116c-e forms a second storage group 108b. Each of the storage groups 108a-b can include one or more data storage domains 118. The data storage domains 118 can use a file based storage system and/or a block based storage system. For example, the data storage domains 118 may use a file based storage system, such as Network File System (NFS) and/or Portable Operating System Interface (Posix). For file based storage, the storage devices 116a-b may handle the storage of information within the data storage domain 118a. The data storage domain 118 may use a block based storage system, such as Internet Small Computer System Interface (iSCSI) or Fiber Channel Protocol (FCP). The block based storage system allows each of the data storage domains 118 to be spread across multiple ones of the storage devices 116a-e. A storage domain may be made available to a host 102 via a storage domain address (e.g., path, connection). The host 102 may access the storage domain 118 using the storage domain address.

The storage manager 104 may coordinate storage operations within the storage groups 108a-b. Example operations may include creating, deleting, and/or modifying data storage domains 118, virtual machine storage 120a-d, connections for storage domains, etc. The operations may also include, for example, adding, editing, deleting or modifying a connection between a host 102 and set of storage resources (e.g., storage group 108) associated with a data storage domain 118. The operations may also include allocating block storage within a storage area network. In some embodiments, the system architecture 100 can include multiple storage managers 104 and each of the multiple storage managers 104 can manage a specific storage group (or a specific set of storage groups) 108. The storage manager 104 may be a hardware device, software executed by a hardware device, or a combination thereof.

The storage manager 104 may create and/or maintain a backup of a data storage domain 118 and/or any VM storage 120 within the data storage domain 118. The storage resources that are allocated to a VM 126a may be referred to as "primary" storage resources and the backup storage resources may be referred to as "secondary" storage resources. For example, the storage group 108a can be used as primary storage and the storage group 108b can be used as secondary storage. The storage manager 104 may maintain any part of storage group 108a, such as a backup of the data storage domain 118a and/or VM storage 120a on a corresponding data storage group 108b. The storage groups 108a-b may have the same physical structure (e.g., both with three 250 GB physical storage). Alternatively, the storage groups 108a-b may have different physical structures. For example, the storage group 108a can have two 750 GB physical storage devices 116a-b and the storage group 108b may have three 500 GB physical storage devices 116c-e. In implementations, the storage groups 108a-b are both the same storage type (e.g., NFS, iSCSI).

In operation, the storage manager 104 may change connection details for a data storage domain 118 without changing the data storage domain 118 itself. The storage manager 104 may change connection details for the data storage domain 118 for any reason, including in response to a failure, as part of a failover operation, in response to input from a system administrator, etc. For example, when switching from using primary storage resources (e.g., storage group 108a) to backup storage resources (e.g., storage group 108b), the storage manager 104 may modify the connection details of the storage domain 118 from the primary storage resources to the secondary storage resources. For example, the storage manager 104 may change the host connection from storage group 108a to storage group 108b. As shown in FIG. 1, the data storage domain 118 is referred to as data storage domain 118a when the connection is to the first storage group 108a and the data storage domain 118 is referred to as data storage domain 118b when the connection is to the second storage group 108. Other than the connection details, data storage domain 118a and data storage domain 118b may be the same in all other regards. Operations of the storage manager 104 are described in further detail in conjunction with FIG. 2.

In implementations, the system architecture 100 includes an admin console 110 that is connected to other components of the system architecture 100 via network 106. The admin console may be a workstation, a desktop computer, a notebook computer, a tablet computer, a mobile phone, a palm-sized computing device, a personal digital assistant (PDA), etc. The admin console 110 can present a user interface for managing storage resources to a system administrator. The admin console 110 can receive input, via the user interface, from the system administrator pertaining to virtualization and/or the storage resources. For example, the admin console 110 may receive input (e.g., from a system administrator) to instantiate a VM 126 and to create a virtual storage 120a (e.g., virtual disk) using a particular data storage domain 118. The admin console 110 can also receive input from a system administrator to modify existing VMs, data storage domains 118 and connections between a host 102 and a data storage domain 118. The admin console 110 can provide the received input to the storage manager 104, the host 102, and any other component of system architecture 100. In some implementations, when receiving input from a system administrator to modify connections to a data storage domain 118, the admin console 110 can request access credentials (e.g., username, password, secure token) from the system administrator. The admin console 110 can validate the access credentials with a validation server (not shown) and if the access credentials are validated, the admin console 110 can provide the input to modify the connection to the storage manager 104.

In some implementations, multiple hosts 102a-n can be connected to the same network infrastructure and to the same storage group 108. The hosts 102a-n can also share the same data storage domain 118. For example, the VM 126a running on a host 102a may have VM storage 120a (e.g., a VM disk) within the data storage domain 118a and the VM 126n running on a host 102b may also have VM storage (not shown) within the data storage domain 118a.

The virtual machine storage 120 may store a virtual instance of an operating system and applications for each VM 126a-n. Each of the hosts 102a-n may have a corresponding virtual desktop server manager (VDSM) (not shown). The virtual desktop server managers manage VMs in operation at the host associated with the virtual desktop server manager. For example, a virtual desktop server manager at the host 102a manages the VM 126a in operation at that host 102a. The virtual desktop server managers may manage VMs by selecting an ISO image to be used for installing an instance of a VM.

In some implementations, a host connects to a storage domain using a storage domain address. This storage domain address may remain unchanged, even if the underlying set of storage devices for the storage domain changes. The storage domain may have a separate connection to the set of storage devices that is transparent to the host. This separate connection to the set of storage devices may be changed, independent of the storage domain address, to point to a different set of storage devices. For example, the separate connection to the set of storage devices may initially point to a first storage group 108a and then may be changed to point to a second storage group 108b without notifying the host. The host 102 remains connected to the storage domain, irrespective of changes made to the underlying set of storages devices.

Figure 2:
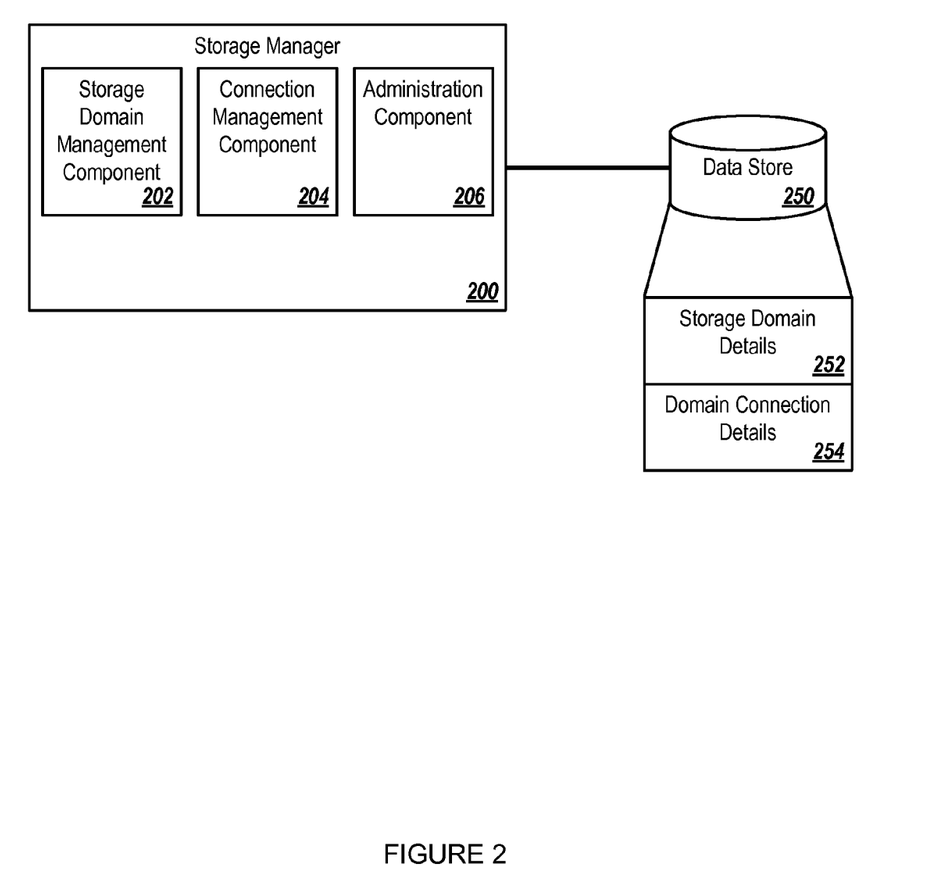
FIG. 2 is a block diagram that illustrates an embodiment of an example storage manager for managing storage connections for one or more hosts, in accordance with embodiments.

FIG. 2 is a block diagram of one implementation of a storage manager 200 for managing storage connections for a storage domain, in accordance with embodiments. The storage manager 200 may be the same as storage manager 104 of FIG. 1. The storage manager 200 can include a storage domain management component 202, a connection management component 204, and an administration component 206. The storage manager 200 can be communicably connected to a data store 250. The storage manager 200 may include more or fewer components.

The storage domain management component 202 can create, modify and delete storage domains. The storage domain management component 202 can receive input to define a storage domain, such as from a system administrator. In response to the received input, the storage domain management component 202 can identify a storage group (such as a storage group 108 of FIG. 1) and can define a storage domain within the storage group that can be associated with as one or more VMs. For example, the storage domain may include a virtual disk that is attached to a VM. After defining a storage domain, the storage domain management component 202 may also record information pertaining to the storage domain in data store 250. For example, the storage domain component may create a name for the storage domain and record it as storage domain details 252 in the data store 250. The storage domain management component 202 can also store other information related to the storage domain as storage domain details 252, such as size, type (e.g., NFS, iSCSI, etc.), and any information related to underlying physical storage (e.g., physical devices) for the storage domain (e.g., manufacturer, capacity, primary storage, secondary storage, backup storage, allowed, blocked, etc.). In some implementations, the storage domain management component 202 can be in communication with the connection management component 204 and can inform the connection management component 204 that a storage domain has been defined.

The connection management component 204 defines connection information (e.g., a path, address) for a storage domain. The connection information can indicate a path to underlying physical storage resources that underlie the storage domain. The connection management component 204 can define connection information for a new storage domain and can record the connection information as domain connection details 254 in data store 250. The domain connection details 254 can be stored in data store 250 in association with its corresponding storage domain details 252. The connection management component 204 can also modify existing connection information for an existing storage domain. When modifying the existing connection information for a storage domain, the connection management component 204 can modify the domain connection details 254 in data store 250. For example, when the domain connection details 254 points to a first storage group (e.g., storage group 108a of FIG. 1), the connection management component 204 can update the domain connection details 254 to point to a second storage group (e.g., storage group 108b of FIG. 1) without modifying the storage domain details 252.

The administration component 206 can provide a user interface that presents data and receives input pertaining to various virtualization operations, including instantiating a VM and defining and modifying storage resources associated with a host. The administration component 206 can provide a user interface document, such as an HTML document that can be rendered on an admin console, such as the admin console 110 of FIG. 1. For example, a system administrator can provide input via a user interface to instantiate a VM. The input can include an instruction to allocate storage (e.g., a virtual disk) of a particular size for the VM and a storage domain where the storage (e.g., virtual disk) is provisioned. In some implementations, the user interface document can include information for available storage domains (e.g., as a list) and the system administrator can select a storage domain from the available storage domains. Once the administration component 206 receives the input, the administration component 206 can communicate the input to a virtual desktop server manager (not shown), which can define a virtual disk (e.g., VM storage 120 of FIG. 1) of a particular size using the storage domain. The virtual disk can be attached to the VM and the storage manager 200 can start the VM using the virtual disk. The administration component 206 can also receive the input programmatically, such as via an application programming interface (API).

The administration component 206 can also receive input, such as from the admin console 110 of FIG. 1 or via an API, to create or modify the domain connection details 254 for a storage domain. For example, in response to a failure of one or more physical storage devices in the storage group, a system administrator may provide input to modify the domain connection details 254 for a storage domain. The administration component 206 can provide the received input to modify the domain connection details 254 to the connection management component 204, which may handle the modification, as described herein. The domain connection details 254 can include a path or address to a physical storage device or storage group (e.g. storage group 108).

The data store 250 can store storage domain details 252 and domain connection details 254. The data store 250 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

In some implementations, the connection management component 204 can modify the domain connection details 254 without specific user input to modify the domain connection details 254. For example, a system administrator can define a primary storage group and a secondary storage group. In the event of a failure of the primary storage group, the storage manager 200 can automatically modify the domain connection details 254 to point to the primary storage group to point to the secondary storage group. In some implementations, the storage manager 200 can provide a notification for a system administrator after the storage manager 200 has modified the domain connection details 254.

In implementations, multiple storage domains may share a connection to a host. If multiple storage domains are sharing a connection, the storage manager 200 may edit the domain connection details 254 when all storage domains referencing the connection are set to a maintenance state, or the storage domains are in unattached status. During an operation to update the domain connection details 254, the storage manager 200 may lock the storage domains (e.g., status=locked) and then update the domain connection details 254 in view of the new pointed connection's properties (the new storage location). The storage domains may be unlocked once the update is complete.

In some implementations, a storage domain may be defined for a volume group. A volume group is a set of pre-defined Logical Unit Numbers (LUNs). For LUNs, to edit their domain connection details 254, all VMs using the LUNs are to be powered off. In some implementations, the storage manager 200 may perform a connectivity test on the LUNs after modifying the domain connection details 254 to ensure that the storage domain is accessible.

For block device storage domains (e.g., iSCSI), some implementations include an option to add (e.g., attach) an additional storage connection to an existing storage domain. Similarly, some implementations include an option to detach a connection from an existing block device storage domain.

In some implementations, as part of an operation to modify the domain connection details 254 for a storage domain, the storage manager 200 may evaluate which physical devices exist in the primary storage group and which physical devices exist in the secondary storage group. If the physical devices in the primary and secondary storage groups are not identical, the storage manager 200 may remap the internal structure of the storage domain according to the physical devices in the secondary storage group. For example, when the primary storage group represents a logical storage of 150 GB comprised of three 50 GB physical storage drives, the secondary storage group may be two 75 GB physical storage drives. The storage manager 200 remaps the storage domain to reflect the difference in underlying physical structure, although the logical storage of 150 GB may not change.

In some implementations, both the primary and secondary storage groups are active and the domain connection details 254 includes connection data for both the primary and secondary storage groups. Under normal circumstances, the domain connection details 254 for the first storage group are unblocked (or activated) and the domain connection details 254 for the secondary storage group are blocked (or deactivated). For example, a firewall may be implemented between the host and the storage groups. The firewall may block the host's connection to the secondary storage group. When changing the connection of the host from the primary storage group to the secondary storage group, the domain connection details 254 for the first storage group can be changed from being unblocked to blocked and the domain connection details 254 for the secondary storage group can be changed from being blocked to unblocked.

Figure 3:
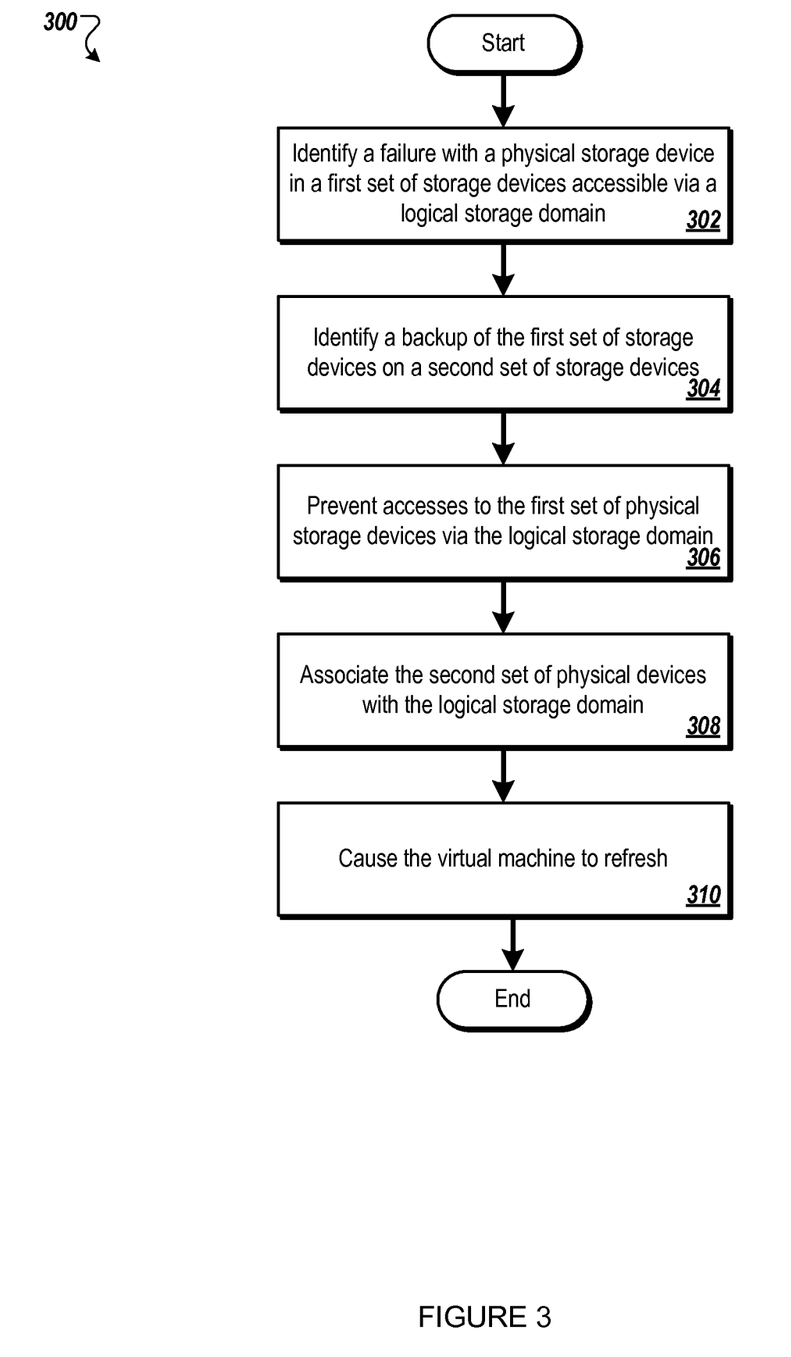
FIG. 3 is a flow diagram illustrating one embodiment for a method for managing storage connections for a host, in accordance with embodiments.

FIG. 3 is a flow diagram of a method 300 related to managing storage connections. The methods can be performed by processing logic that may include hardware (circuitry, dedicated logic, etc.), software (such as is run on a general purpose computer system or a dedicated machine), or a combination of both. In one implementation, the method is performed by a storage manager, such as the storage manager 104 of FIG. 1. For simplicity of explanation, methods described herein are depicted and described as a series of acts. However, acts in accordance with this disclosure can occur in various orders and/or concurrently, and with other acts not presented and described herein. Further, not all illustrated acts may be required to implement the methods in accordance with the disclosed subject matter. In addition, those skilled in the art will understand and appreciate that the methods could alternatively be represented as a series of interrelated states via a state diagram of events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At block 302 of method 300, processing logic identifies a failure with at least one physical storage device of a first set of physical storage devices accessible to a host via a logical storage domain. The logical storage domain may have an assigned address (e.g., a path, a uniform resource locator (URL)). The failure may include a loss of connection to at least one physical storage device of the first set of physical storage devices. The processing logic may identify the failure in response to input received from a system administrator via a user interface.

At block 304, the processing logic identifies a backup of the first set of physical storage devices. The backup includes a second set of physical storage devices that are not accessible to the host. In some implementations, identifying the backup of the first set of physical storage devices includes receiving input from a system administrator that indicates the logical storage domain is to point to the second set of physical storage devices. In some implementations, the input is received via a graphical user interface or from an application programming interface (API).

At block 306, the processing logic prevents a virtualized environment (e.g., a VM) from accessing the first set of physical storage devices. In some implementations, preventing the first set of physical storage devices from accessing the logical storage domain includes blocking a first connection between the host that is associated with the virtualized environment and the first set of physical storage devices. A second connection between the host and the second set of physical storage devices may initially be blocked. In some implementations, associating the second set of physical storage devices with the logical storage domain and the address includes unblocking the second connection between the host and the second set of physical storage devices.

At block 308, the processing logic associates the second set of physical storage devices with the logical storage domain to cause storage access of the host to be redirected to the second set of physical storage devices via the logical storage domain. In some implementations, the first set of physical storage devices includes a first number of physical storage devices and the second set of physical storage devices includes a second number of physical storage devices. In some implementations, the first set of physical storage devices includes a first storage structure. When associating the second set of physical storage devices with the logical storage domain, the processing logic may map a second storage structure of the second set of physical storage devices that is different from the first storage structure. In some implementations, the second set of physical storage devices includes a first physical storage device associated with a first physical machine and a second physical storage device associated with a second physical machine.

At block 310, the processing logic causes the VM to restart or refresh in response to associating the second set of physical storage devices with the logical storage domain.

Figure 4:
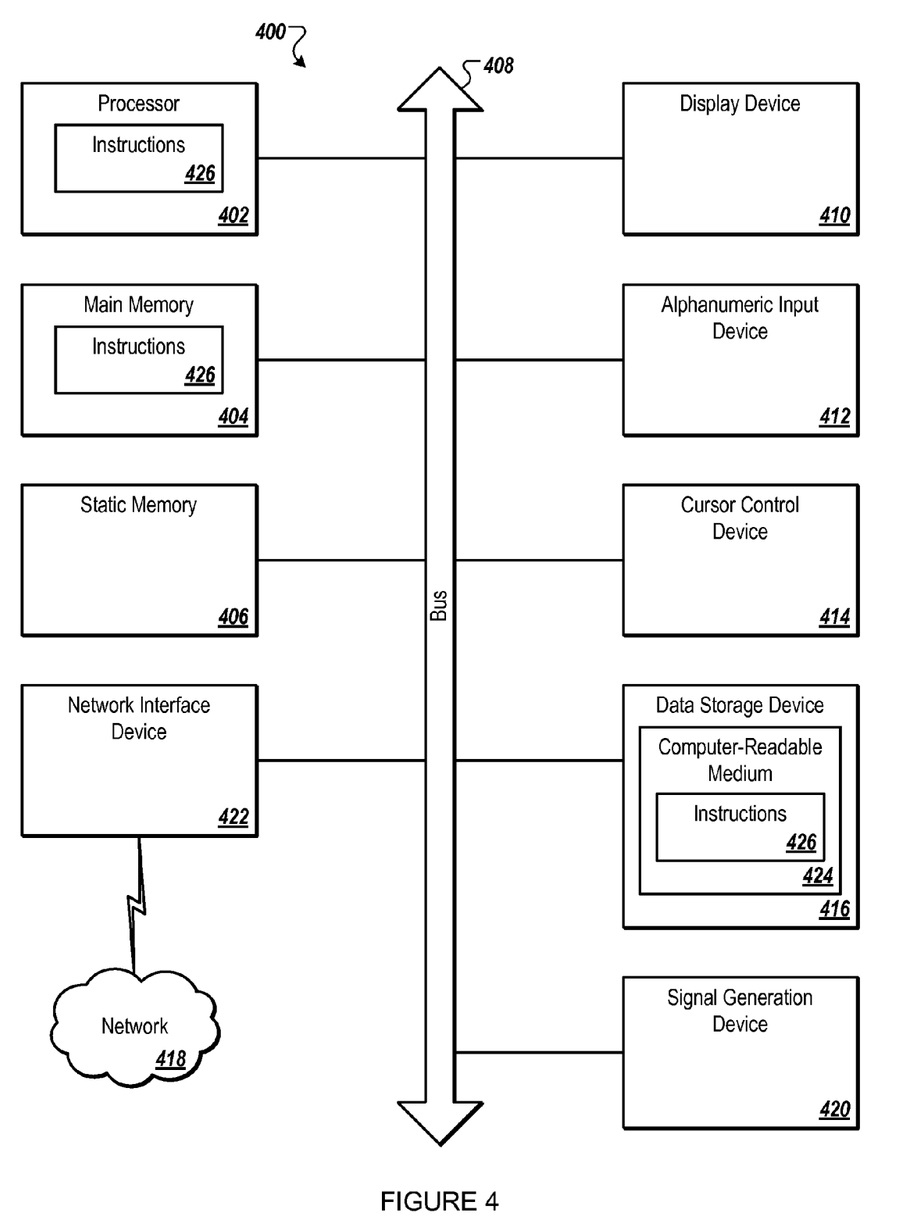
FIG. 4 illustrates a diagrammatic representation of a machine in the example form of a computer system, in accordance with embodiments.

FIG. 4 illustrates a diagrammatic representation of a machine in the example form of a computer system 400 within which a set of instructions, for causing the machine to perform any one or more of the methodologies discussed herein, may be executed. The computer system 400 may correspond to computing device associated with the storage manager 104 of FIG. 1. In embodiments of the present invention, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM)), a static memory 406 (e.g., flash memory, static random access memory (SRAM), etc.), and a secondary memory 416 (e.g., a data storage device), which communicate with each other via a bus 408.

The processing device 402 represents one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core CPU, a multi-core CPU and a massively multi-core system that includes many interconnected integrated circuits, each of which may include multiple processor cores. The processing device 402 may therefore include multiple processors. The processing device 402 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 402 may also be one or more special-purpose processing devices such as an application specific integrated circuit (ASIC), a field programmable gate array (FPGA), a digital signal processor (DSP), network processor, or the like.

The computer system 400 may further include one or more network interface devices 422 (e.g., NICs). The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The secondary memory 416 may include a machine-readable storage medium (or more specifically a computer-readable storage medium) 424 on which is stored one or more sets of instructions 454 embodying any one or more of the methodologies or functions described herein (e.g., storage manager 104). The instructions 454 may also reside, completely or at least partially, within the main memory 404 and/or within the processing device 402 during execution thereof by the computer system 400; the main memory 404 and the processing device 402 also constituting machine-readable storage media.

While the computer-readable storage medium 424 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine that cause the machine to perform any one or more of the methodologies of the present invention. The term "computer-readable storage medium" shall accordingly be taken to include, but not be limited to, non-transitory media such as solid-state memories, and optical and magnetic media.

The modules, components and other features described herein can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying", "probing", "establishing", "detecting", "modifying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
identifying a failure with at least one physical storage device of a first set of physical storage devices accessible to a virtualized environment via a logical storage domain, the logical storage domain having an assigned address;
identifying a backup of the first set of physical storage devices, wherein the backup comprises a second set of physical storage devices that are not accessible to the virtualized environment;
preventing, by a processing device, the virtualized environment from accessing the first set of physical storage devices; and
associating, by the processing device, the second set of physical storage devices with the assigned address of the logical storage domain to cause storage access of the virtualized environment to be redirected to the second set of physical storage devices via the logical storage domain.

2. The method of claim 1, wherein the failure comprises a loss of connection to the at least one physical storage device of the first set of physical storage devices.

3. The method of claim 1, wherein the virtualized environment comprises a virtual machine, the method further comprising causing the virtual machine to refresh in response to associating the second set of physical storage devices with the logical storage domain.

4. The method of claim 1, wherein identifying the backup of the first set of physical storage devices comprises receiving input from a system administrator that indicates the logical storage domain is to point to the second set of physical storage devices.

5. The method of claim 4, wherein the input is received via a graphical user interface or from an application programming interface (API).

6. The method of claim 1, wherein preventing the virtualized environment from accessing the first set of physical storage devices comprises blocking a first connection between a host that is associated with the virtualized environment and the first set of physical storage devices, wherein a second connection between the host and the second set of physical storage devices is initially blocked, and wherein associating the second set of physical storage devices with the assigned address of the logical storage domain unblocking the second connection between the host and the second set of physical storage devices.

7. The method of claim 1, wherein the first set of physical storage devices comprises a first number of physical storage devices and wherein the second set of physical storage devices comprises a second number of physical storage devices.

8. The method of claim 1, wherein the first set of physical storage devices comprises a first storage structure, and wherein associating the second set of physical storage devices with the logical storage domain comprises mapping a second storage structure of the second set of physical storage devices that is different from the first storage structure.

9. The method of claim 1, wherein the second set of physical storage devices comprises a first physical storage device associated with a first physical machine and a second physical storage device associated with a second physical machine.

10. A non-transitory computer readable storage medium having instructions that, when executed by a processing device, cause the processing device to:
identify a failure with at least one physical storage device of a first set of physical storage devices accessible to a virtualized environment via a logical storage domain, the logical storage domain having an assigned address;
identify a backup of the first set of physical storage devices, wherein the backup comprises a second set of physical storage devices that are not accessible to the virtualized environment;
prevent, by the processing device, the virtualized environment from accessing the first set of physical storage devices; and
associate, by the processing device, the second set of physical storage devices with the assigned address of the logical storage domain to cause storage access of the virtualized environment to be redirected to the second set of physical storage devices via the logical storage domain.

11. The non-transitory computer readable storage medium of claim 10, wherein the failure comprises a loss of connection to the at least one physical storage device of the first set of physical storage devices.

12. The non-transitory computer readable storage medium of claim 10, wherein the virtualized environment comprises a virtual machine, the processing device further to cause the virtual machine to refresh in response to associating the second set of physical storage devices with the logical storage domain.

13. The non-transitory computer readable storage medium of claim 10, wherein to prevent the virtualized environment from accessing the first set of physical storage devices, the processing device to block a first connection between a host that is associated with the virtualized environment and the first set of physical storage devices, wherein a second connection between the host and the second set of physical storage devices is initially blocked, and wherein associating the second set of physical storage devices with the assigned address of the logical storage domain comprises unblocking the second connection between the host and the second set of physical storage devices.

14. A computing device comprising:
a memory; and
a processing device, operatively coupled to the memory, the processing device to:
identify a failure with at least one physical storage device of a first set of physical storage devices accessible to a virtualized environment via a logical storage domain, the logical storage domain having an assigned address;
identify a backup of the first set of physical storage devices, wherein the backup comprises a second set of physical storage devices that are not accessible to the virtualized environment;
prevent the virtualized environment from accessing the first set of physical storage devices; and
associate the second set of physical storage devices with the assigned address of the logical storage domain to cause storage access of the virtualized environment to be redirected to the second set of physical storage devices via the logical storage domain.

15. The computing device of claim 14, wherein the failure comprises a loss of connection to the at least one physical storage device of the first set of physical storage devices.

16. The computing device of claim 14, wherein the virtualized environment comprises a virtual machine, wherein the processing device is further to cause the virtual machine to refresh in response to associating the second set of physical storage devices with the logical storage domain.

17. The computing device of claim 14, wherein when identifying the backup of the first set of physical storage devices, the processing device is to receive input from a system administrator that indicates the logical storage domain is to point to the second set of physical storage devices.

18. The computing device of claim 14, wherein when preventing the virtualized environment from accessing the first set of physical storage devices, the processing device is to block a first connection between a host that is associated with the virtualized environment and the first set of physical storage devices,
wherein a second connection between the host and the second set of physical storage devices is initially blocked, and
wherein when associating the second set of physical storage devices with the assigned address of the logical storage domain, the processing device is to unblock the second connection between the host and the second set of physical storage devices.

19. The computing device of claim 14, wherein the first set of physical storage devices comprises a first number of physical storage devices and wherein the second set of physical storage devices comprises a second number of physical storage devices.

20. The computing device of claim 14, wherein the second set of physical storage devices comprises a first physical storage device associated with a first physical machine and a second physical storage device associated with a second physical machine.

* * * * *